US006660369B2

(12) United States Patent
MacMillan

(10) Patent No.: US 6,660,369 B2
(45) Date of Patent: Dec. 9, 2003

(54) PAPER COATING FOR INK JET PRINTING

(75) Inventor: David Starling MacMillan, Winchester, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/314,775

(22) Filed: Dec. 9, 2002

(65) Prior Publication Data

US 2003/0118793 A1 Jun. 26, 2003

Related U.S. Application Data

(62) Division of application No. 09/484,700, filed on Jan. 18, 2000, now Pat. No. 6,528,119.

(51) Int. Cl.[7] ............................ B32B 3/00; B32B 5/66; B32B 23/00

(52) U.S. Cl. ....................... 428/195; 428/206; 428/208; 428/211; 428/521; 428/537.5; 428/537.7

(58) Field of Search ................................ 428/195, 206, 428/208, 24, 521, 537.5, 537.7

(56) References Cited

U.S. PATENT DOCUMENTS

| | | | | | |
|---|---|---|---|---|---|
| 4,382,262 | A | | 5/1983 | Savit | |
| 4,446,174 | A | | 5/1984 | Maekawa et al. | |
| 4,538,160 | A | | 8/1985 | Uchiyama | |
| 4,554,181 | A | * | 11/1985 | Cousin et al. | 428/32.3 |
| 4,694,302 | A | | 9/1987 | Hackleman et al. | |
| 4,830,911 | A | | 5/1989 | Kojima et al. | |
| 4,943,813 | A | | 7/1990 | Palmer et al. | |
| 4,954,395 | A | | 9/1990 | Hasegawa et al. | |
| 4,963,189 | A | | 10/1990 | Hindagolla | |
| 5,006,862 | A | | 4/1991 | Adamic | |
| 5,118,570 | A | | 6/1992 | Malhotra | |
| 5,156,675 | A | | 10/1992 | Breton et al. | |
| 5,181,045 | A | | 1/1993 | Shields et al. | |
| 5,223,473 | A | * | 6/1993 | Oliver et al. | 503/226 |
| 5,270,103 | A | * | 12/1993 | Oliver et al. | 428/219 |
| 5,302,249 | A | * | 4/1994 | Malhotra et al. | 162/135 |
| 5,320,668 | A | | 6/1994 | Shields et al. | |
| 5,352,503 | A | * | 10/1994 | Drake et al. | 428/32.1 |
| 5,428,383 | A | | 6/1995 | Shields et al. | |
| 5,429,860 | A | | 7/1995 | Held et al. | |
| 5,439,739 | A | | 8/1995 | Furukawa et al. | |
| 5,555,008 | A | | 9/1996 | Stoffel et al. | |
| 5,580,372 | A | | 12/1996 | Gino et al. | |
| 5,623,041 | A | | 4/1997 | Boucher | |
| 5,640,187 | A | | 6/1997 | Kashiwazaki et al. | |
| 5,645,888 | A | | 7/1997 | Titterington et al. | |
| 5,679,143 | A | | 10/1997 | Looman | |
| 5,695,820 | A | | 12/1997 | Davis et al. | |
| 5,723,179 | A | | 3/1998 | Wong et al. | |
| 5,746,818 | A | | 5/1998 | Yatake | |
| 5,882,388 | A | | 3/1999 | Adair et al. | |
| 5,919,559 | A | | 7/1999 | Nakano et al. | |
| 6,150,289 | A | * | 11/2000 | Chen et al. | 501/148 |
| 6,508,956 | B1 | * | 1/2003 | Baker et al. | 252/301.16 |
| 6,528,119 | B1 | * | 3/2003 | MacMillan | 427/261 |
| 6,585,365 | B1 | * | 7/2003 | MacMillan | 347/100 |
| 6,590,023 | B2 | * | 7/2003 | MacMillan | 524/495 |

FOREIGN PATENT DOCUMENTS

| | | | |
|---|---|---|---|
| EP | 0581038 | A1 | 2/1994 |
| EP | 0778321 | A2 | 6/1997 |
| EP | 0791473 | A2 | 8/1997 |
| EP | 0812956 | A1 | 12/1997 |
| EP | 0822094 | A2 | 2/1998 |
| EP | 0832741 | A2 | 4/1998 |
| EP | 0858900 | A2 | 8/1998 |
| EP | 0876914 | A1 | 11/1998 |
| EP | 0885744 | A1 | 12/1998 |

* cited by examiner

*Primary Examiner*—Leszek Kiliman
(74) *Attorney, Agent, or Firm*—Luedeka, Neely & Graham, P.C.

(57) ABSTRACT

The invention provides an improved paper coating composition for ink jet printing applications. The composition contains from about 2 to about 1 parts by weight polyvalent metal salt, from about 0 to about 30 parts by weight deionized water, an effective amount of cationic amine polymer and surfactant and from about 35 to about 60 parts by weight of an ink penetrant promoter selected from the group consisting of 1,2-propanediol, dipropylene glycol and mixtures of 1,2-propanedioland dipropylene glycol. Since the composition is free from ethylene glycol components, the composition is safer to use and less harmful to humans and the environment. The composition has also been found to provide improved ink drying with less bleeding or smearing of image.

17 Claims, No Drawings

PAPER COATING FOR INK JET PRINTING

This application is DIV of Ser. No. 09/484,700 filed Jan. 18, 2000, whis is now U.S. Pat. No. 6,528,119.

FIELD OF THE INVENTION

The invention relates to improved coatings for paper for ink jet printing applications and in particular, to coatings which enhance ink drying and produce higher quality printed images.

BACKGROUND OF THE INVENTION

Ink jet printing methods utilize printheads having orifices which eject ink droplets onto a print medium. For higher quality, higher resolution printing applications, the orifices of the printheads have been increased in number and their diameter significantly reduced in size. Accordingly, for full color printed images, inks are formulated to include dyes and/or pigments and various carriers and/or solvents which are resistant to drying or otherwise clogging the nozzle holes of the printhead. Such ink formulations, however often adversely affect the properties of the ink deposited on the print medium resulting in longer drying times and/or color mixing or bleeding of the images resulting in poorer quality images.

Various print media may be used for ink jet printing applications depending on the ink formulations. Such media include cellulosic webs, synthetic papers, polymeric films and the like. As advances in ink jet printing have occurred, specialty papers containing exotic coatings have been developed. Such specialty papers are often more expensive than uncoated papers and may contain coatings which are not compatible with the wide variety of ink formulations being used or developed for ink jet printing applications.

Despite the abundance of specialty webs for ink jet printing, cellulosic webs remain the most widely used print media. Cellulosic webs are made by conventional paper making techniques wherein a fibrous pulp is deposited on a wire screen and dried to form a web. Accordingly, the webs contain minute pores or voids between the cellulosic fibers for absorption of liquids therein. The porosity of the webs may be changed by use of specialty coatings such as clays and the like which may change the hydrophilic properties of the webs so that the webs absorb or repel aqueous and/or organic fluids which may be used as carrier fluids in ink formulations.

Ideally, it is desirable for only the carrier fluid of the ink formulation to penetrate into the web thereby depositing colorant on the outer surface of the web. Balancing the properties of the ink formulations so that the formulations are adaptable for use with a wide variety of print media is extremely difficult. It is even more difficult to provide ink formulations which may be used on uncoated or plain paper webs. Accordingly, a need exists for print medium which is adaptable to accept improved dye and/or pigment based ink formulations.

SUMMARY OF THE INVENTION

With regard to the above and other objects and advantages thereof, the invention provides a paper coating composition for ink jet printing applications. The composition includes from about 2 to about 10 parts by weight polyvalent metal salt, from about 0 to about 30 parts by weight deionized water, an effective amount of cationic amine polymer and surfactant and from about 35 to about 60 parts by weight of an ink penetrant promoter selected from the group consisting of 1,2-propanediol, dipropylene glycol and mixtures of 1,2-propanediol and dipropylene glycol.

In another aspect the invention provides a method for improving print resolution, the method including applying an aqueous penetrant promoter composition to a cellulosic web to provide an ink receptive coating and printing on the coated web. The promoter composition applied to the web contains from about 2 to about 10 parts by weight polyvalent metal salt, from about 0 to about 30 parts by weight deionized water, an effective amount of cationic amine polymer and surfactant and from about 35 to about 60 parts by weight of an ink penetrant promoter selected from the group consisting of 1,2-propanediol, dipropylene glycol and mixtures of 1,2-propanedioland dipropylene glycol.

In yet another aspect the invention provides a cellulosic web containing a penetrant promoter coating and ink. The coating is applied to the web prior to printing in an amount sufficient to promote ink drying and/or penetration of ink into the web so as to reduce ink bleeding. The promoter composition includes from about 2 to about 10 parts by weight polyvalent metal salt, from about 0 to about 30 parts by weight deionized water, an effective amount of cationic amine polymer and surfactant and from about 35 to about 60 parts by weight of an ink penetrant promoter selected from the group consisting of 1,2-propanediol, dipropylene glycol and mixtures of 1,2-propanedioland dipropylene glycol.

The term "bleeding" as used herein refers to the unintended mixing of colors or wicking of ink colorant into the web rather than remaining on the surface of the web. Webs which are highly absorbent of the colorant tend to produce low resolution images because each ink dot tends to spread due to the affinity of the web fibers for the colorants in the ink. If the ink colorant penetrates too far into the web, too much light may be scattered by the interstices of the upper portion of the web resulting in a lower contrast image. Accordingly, it is desirable that only the ink carrier be absorbed into the web while the colorant remains substantially on the surface of the web.

An important advantage of the invention is that the promoter composition is more environmentally friendly because of the inclusion of 1,2-propanediol or dipropylene glycol than previous compositions which contain diethylene glycol as the penetrant promoter. 1,2-Propanediol and di-propylene glycol are widely used in soaps and cosmetics and as such are relatively safer than diethylene glycol or other polyhydric alcohols. An unexpected benefit of the use of 1,2-propanediol and/or dipropylene glycol is that paper coating compositions containing such glycols exhibit increased ink drying rates which enable higher print speeds as compared to other ink penetrant formulations.

DETAILED DESCRIPTION OF THE PREFERRED EMBODIMENTS

Considering the need to provide enhanced drying of ink formulations in order to reduce or eliminate bleeding and/or ink smearing, the invention provides an improved method and composition for promoting drying of inks on plain paper webs. According to the invention, a penetrant promoter formulation is provided for coating cellulosic webs, preferably immediately prior to printing, in order to promote ink drying and color fastness. The promoter formulation is preferably an aqueous-based solution containing a fluid component which promotes increased penetration of the ink carrier into the web without promoting significant penetration of the colorant into the web.

A key component of the promoter formulation is a polyhydric alcohol selected from the group consisting of 1,2-propanediol, dipropylene glycol and mixtures thereof. The amount of polyhydric alcohol in the promoter formulation ranges from about 30 to about 70 percent by weight of the formulation, preferably from about 35 to about 65 percent by weight and most preferably from about 35 to about 60 percent by weight of the formulation. The polyhydric alcohol is preferably 100 percent by weight 1,2-propanediol or a mixture containing from about 75 to about 100 percent by weight 1,2-propanediol and from about 0 to about 25 percent by weight dipropylene glycol.

Another component of the promoter formulation is a polyvalent metal salt. It is preferred that the polyvalent metal salt be substantially soluble in water. The salt preferably contains a polyvalent metal cation and an inorganic or organic anion component. The polyvalent metal cation may be selected from $Ca^{2+}$, $Cu^{2+}$, $Ni^{2+}$, $Mg^{2+}$, $Zn^{2+}$, $Ba^{2+}$, $Al^{3+}$, $Fe^{3+}$ and $Cr^{3+}$. Of the foregoing, calcium and magnesium cations are preferred.

The anion component of the polyvalent metal salt may selected from a nitrate group, a chlorate group, a carboxylate group and a halogen ion such as $Cl^-$, $I^-$ and $Br^-$. Of the foregoing anions, the chloride ion and acetate group are preferred and the chloride ion is most preferred. A particularly preferred polyvalent metal salt is calcium chloride dihydrate. The amount of polyvalent metal salt in the promoter formulation preferably ranges from about 2 to about 10 percent by weight of the formulation.

The promoter formulation also preferably contains a cationic amine polymer. The amine polymer has a number average molecular weight ($MW_N$) ranging from about 2,000 to about 250,000, preferably from about 2,000 to about 10,000 $MW_N$, and most preferably from about 7,500 to about 10,000 $MW_N$. A particularly preferred cationic amine polymer is a polymer having the following structure:

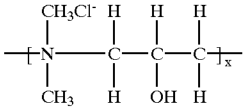

wherein x is an integer ranging from about 15 to about 2000. Such polyamines include cationic polyamines derived from dimethylamine and epichlorohydrin such as the polyamine available from Cytec Industries, Inc. of West Paterson, N.J. under the trade name SUPERFLOC C-567. Another example of a useful polyamine is available from Cytec Industries, Inc. under the trade name SUPERFLOC C-572. The promoter formulation preferably contains from about 5 to about 30 percent by weight of the cationic amine polymer.

Another component of the promoter formulation is a polysiloxane surfactant. The surfactant is preferably a non-hydrolyzable copolymer based on polydimethylsiloxane. The general structure of the surfactant is as follows:

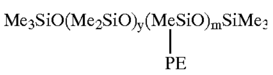

wherein:

PE=—$CH_2CH_2CH_2O(EO)_n(PO)_oZ$

Me=a methyl group

EO=an ethyleneoxy group

PO=1,2-propyleneoxy group

Z=H or a lower alkyl radical y=an integer ranging from about 1 to about 10.

m=an integer ranging from about 1 to about 10.

n=an integer ranging from about 0 to about 5 and o=an integer ranging from about 0 to about 5.

The surfactant preferably has a number average molecular weight ranging from about 800 to about 5000 $MW_N$, preferably from about 1000 to about 4000 $MW_N$. Representative structures include the following:

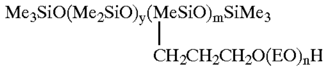

which is available from CK Witco of Greenwich, Conn. under the tradename SILWET L-7604; and

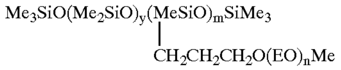

which is available from CK Witco of Greenwich, Conn. under the tradename SILWET L-7607, wherein Me, EO, y, m and n are as defined above. The polysiloxane surfactant is preferably present in the composition in an amount ranging from about 0 to about 5 parts by weight of the total weight of the formulation.

The balance of the promoter composition is water, preferably deionized water. Accordingly, the promoter composition may contain from about 0 to about 40 parts by weight water, most preferably from about 15 to about 30 parts by weight water.

A preferred promoter formulation according to the invention is contained in the following table 1:

TABLE 1

| Component | Amount (wt.%) |
|---|---|
| SUPERFLOC C-567 | 14.30 |
| calcium chloride dihydrate | 7.35 |
| deionized water | 18.10 |
| SILWET (L-7600, L-7604 OR L-7607) | 1.00 |
| 1,2 propanediol | 44.40 |
| di(propylene glycol) | 14.8 |

Other promoter formulations which may be used according to the invention include the following as set forth in Table 2:

TABLE 2

| Component | Amount (wt.%) | Amount (wt.%) |
|---|---|---|
| SUPERFLOC C-567 | 14.5 | 14.5 |
| magnesium acetate tetrahydrate | 25.0 | — |
| calcium acetate hydrate | — | 4.5 |
| deionized water | 11.5 | 19.5 |
| SILWET (L-7600, L-7604 OR L-7607) | 1.0 | 1.0 |
| 1,2 propanediol | 48.0 | 45.5 |
| di(propylene glycol) | — | 15 |

In order to make the promoter composition the components are preferably mixed by stirring the components together in a suitable container. In order to provide the shortest mixing time, it is preferred to introduce the components to the mixing vessel in the following order (1) water, (2) amine polymer, (3) salt, (4) glycols and (5) solvent. The components may be mixed together in any order to provide the same product, however the foregoing order is preferred in order to reduce mixing times.

The promoter composition may be applied to a web by a variety of methods including spraying and roll coating, reverse roll coating and the like. It is particularly preferred to apply the promoter composition to the web immediately prior to printing so that the web is wet with the promoter composition. The promoter composition may also be applied to the web by thermal jet ejectors similar to the ejectors used for ink. The amount of promoter composition applied to the web preferably ranges from about 0.08 milligrams per square centimeter ($mg/cm^2$) to about 0.25 $mg/cm^2$.

Typically ink is applied to a web in an amount ranging from about 1 to about 2 $mg/cm^2$. Accordingly, it is preferred that the ratio of ink to promoter composition on the web range from about 6:1 to about 18:1 parts by weight ink to part by weight promoter composition. It is also preferred that the promoter composition be applied in close proximity to the printhead of the ink jet printer so that the web remains relatively damp for acceptance of ink ejected from the ink jet printhead. The term "relatively damp" means that the web surface contains sufficient promoter to enhance the penetration rate of the ink carrier into the web.

The inks which may be used with the promoter composition include a wide variety of inks containing pigment or dye colorants. Representative ink formulations include the following as set forth in Tables 3 and 4:

TABLE 3

BLACK INK

| Component | Amount (wt%) |
|---|---|
| carbon black | 4 |
| Polyethylene glycol (PEG 1000) | 5 |
| 2-pyrrolidone | 5 |
| Thiodiethanol | 5 |
| 1,2-hexanediol | 0.5 |
| Deionized water | 98.5 |

TABLE 4

| | Amount (wt.%) | | |
|---|---|---|---|
| Component | Cyan | Magenta | Yellow |
| DIRECT BLUE 199[1] | 3 | — | — |
| LEXMARK 93A[2] | — | 3 | — |
| Acid yellow 23 | — | — | 3 |
| 2-pyrrolidone | 7.5 | 7.5 | 7.5 |
| tetraethylene glycol | 12.5 | 12.5 | 12.5 |
| 1,2-hexanediol | 4 | 4 | 4 |
| PROXEL GXL[3] | 0.2 | 0.2 | 0.2 |
| HAMPENE Na3T[4] | 0.1 | 0.1 | 0.1 |
| sodium tetraborate | 0.2 | 0.2 | 0.2 |
| SILWET L-7607[5] | 0.5 | 0.5 | — |
| SILWET L-7600[5] | — | — | 0.5 |
| deionized water | 71.1 | 71.1 | 71.1 |

[1]Direct Blue 199 is a cyan dye available from Avecia, Inc. of Wilmington, Delaware.
[2]LEXMARK 93A is a magenta dye available from Lexmark International of Lexington, Kentucky.
[3]PROXEL GXL is biocide available from Avecia, Inc. of Wilmington, Delaware.
[4]HAMPENE Na3T is chelating agent available from HVC of Cincinnati, Ohio.
[5]SILWET is a polysiloxane surfactant available from CK Witco of Greenwich, Connecticut.

It is contemplated, and will be apparent to those skilled in the art from the foregoing specification that modifications and/or changes may be made in the embodiments of the invention. Accordingly it is expressly intended that the foregoing are only illustrative of the preferred embodiments and is not limiting thereto and that the true spirit and scope of the present invention be determined by reference to the appended claims.

What is claimed is:

1. A paper coating composition for ink jet printing applications, the composition from about 2 to about 10 parts by weight polyvalent metal salt, from about 0 to about 30 parts by weight deionized water, and effective amount of cationic amine polymer and surfactant and from about 35 to about 60 parts by weight of an ink penetrant promoter selected from the group consisting of 1,2-propanediol, dipropylene glycol and mixtures of 1,2-propanedioland dipropylene glycol.

2. The coating composition of claim 1 further comprising from about 5 to about 30 percent by weight cationic amine polymer.

3. The coating composition of claim 2 wherein the cationic amine polymer is a compound of the formula

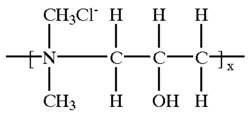

wherein x is an integer ranging from about 15 to about 2000.

4. The coating composition of claim 2 wherein the cationic amine polymer is derived from dimethylamine and epichlorohydrin and has a number average molecular weight ranging from about 7,500 to about 10,000 $MW_N$.

5. The coating composition of claim 2 wherein the surfactant comprises a polysiloxane surfactant.

6. The coating composition of claim 5 wherein the polysiloxane surfactant is a compound having the following general structure:

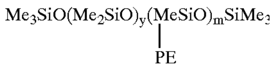

wherein: PE comprises $—CH_2CH_2CH_2O(EO)_n(PO)_oZ$, Me is a methyl group, EO is an ethyleneoxy group, PO is a 1,2-propyleneoxy group, Z is H or a lower alkyl radical y is an integer ranging from about 1 to about 10, m is an integer ranging from about 1 to about 10, n is an integer ranging from about 0 to about 5 and o is an integer ranging from about 0 to about 5.

7. The coating composition of claim 1 wherein the polyvalent metal salt is selected from the group consisting of calcium chloride, magnesium chloride, calcium acetate hydrate, magnesium acetate tetrahydrate and mixtures thereof.

8. A cellulosic web containing the coating composition of claim 1.

9. A cellulosic web containing ink and a penetrant promoter coating the coating being applied to the web prior to printing in an amount sufficient to promote ink drying and/or penetration of ink into the web so as to reduce ink bleeding, the promoter composition comprising from about 2 to about 10 parts by weight polyvalent metal salt, from about 0 to about 30 parts by weight deionized water, an effective amount of cationic amine polymer and surfactant and from about 35 to about 60 parts by weight of an ink penetrant promoter selected from the group consisting of 1,2-propanediol, dipropylene glycol and mixtures of 1,2-propanedioland dipropylene glycol.

10. The web of claim 9 wherein the penetrant promoter coating contains from about 5 to about 30% by weight cationic amine polymer.

11. The web of claim 10 wherein the cationic amine polymer is a compound of the formula

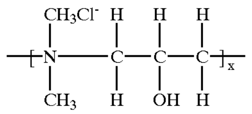

wherein x is an integer ranging from about 15 to about 2000.

12. The web of claim 10 wherein the cationic amine polymer is derived from dimethylamine and epichlorohydrin and has a number average molecular weight ranging from about 7,500 to about 10,000 $MW_N$.

13. The web of claim 10 wherein the penetrant promoter coating further comprises a polysiloxane surfactant.

14. The web of claim 13 wherein the polysiloxane surfactant is a compound having the following general structure:

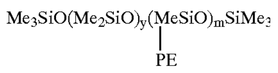

wherein: PE comprises $—CH_2CH_2CH_2O(EO)_n(PO)_oZ$, Me is a methyl group, EO is an ethyleneoxy group, PO is a 1,2-propyleneoxy group, Z is H or a lower alkyl radical y is an integer ranging from about 1 to about 10, m is an integer ranging from about 1 to about 10, n is an integer ranging from about 0 to about 5 and o is an integer ranging from about 0 to about 5.

15. The web of claim 9 wherein the polyvalent metal salt is selected from the group consisting of calcium chloride, magnesium chloride, calcium acetate hydrate, magnesium acetate tetrahydrate and mixtures thereof.

16. The web of claim 9 wherein the ratio of ink to penetrant promoter coating ranges from about 6:1 to about 18:1 parts of ink per part of penetrant promoter coating by weight.

17. The web of claim 9 wherein the penetrant promoter coating is applied to a cellulosic web in an amount ranging from about 0.08 $mg/cm^2$ to about 25 $mg/cm^2$.

* * * * *